(12) United States Patent
Kupisiewicz et al.

(10) Patent No.: US 12,192,062 B2
(45) Date of Patent: Jan. 7, 2025

(54) METHODS FOR IMPLEMENTING TIME-TRAVELLING NETWORKS USING EXTENSIONS TO GRAPH DATABASES

(71) Applicant: Cisco Technology, Inc., San Jose, CA (US)

(72) Inventors: Piotr Jerzy Kupisiewicz, Cracow (PL); Olaf Meller, Varna (BG); Michael Chomicz, Toronto (CA); Radoslaw Konrad Ruchala, Nowy Sacz (PL); Manoj Kumar, Raleigh, NC (US); David Pryor, Clayton, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/955,812

(22) Filed: Sep. 29, 2022

(65) Prior Publication Data
US 2024/0073097 A1    Feb. 29, 2024

Related U.S. Application Data

(60) Provisional application No. 63/401,241, filed on Aug. 26, 2022.

(51) Int. Cl.
*H04L 41/12* (2022.01)
*G06F 16/901* (2019.01)
(Continued)

(52) U.S. Cl.
CPC .......... *H04L 41/12* (2013.01); *G06F 16/9024* (2019.01); *H04L 41/0859* (2013.01); *H04L 41/22* (2013.01)

(58) Field of Classification Search
CPC ..... H04L 41/0859; H04L 41/12; H04L 41/22; G06F 16/9024
See application file for complete search history.

(56) References Cited

U.S. PATENT DOCUMENTS 8,878,852 B1 * 11/2014 Klein .................... H04L 49/555
345/440
10,585,575 B2 * 3/2020 Kindelsberger ...... G06F 3/0484
(Continued)

FOREIGN PATENT DOCUMENTS

WO    2019028992 A1    2/2019
WO    2020254376 A1    12/2020

OTHER PUBLICATIONS

Raetz, William. "A new approach to graph analysis for activity based intelligence." 2012 IEEE Applied Imagery Pattern Recognition Workshop (AIPR). IEEE. (Year: 2012).*
(Continued)

*Primary Examiner* — John M MacIlwinen
(74) *Attorney, Agent, or Firm* — Edell, Shapiro & Finnan, LLC

(57) ABSTRACT

Methods are presented herein for a reduced state machine that describes nodes and relationship dynamics representing real network elements (networking devices and software processes) in a computer/data network, and abstracted logical items. Logical states of networking features of the network elements are reflected in the graph, while configuration data is stored for completeness. A method called a "Versioner Algorithm" is provided to record the temporal history of a node and its state over time within the node's metadata itself, while recorded relationships represent logical relations between observed nodes. A method is also provided to time-travel back to observe a historical view of the network. Further still, a method is provided to a difference of two historical topologies and return that data in human-readable or machine consumable form.

20 Claims, 10 Drawing Sheets

(51) Int. Cl.
*H04L 41/0859* (2022.01)
*H04L 41/22* (2022.01)

(56) References Cited

U.S. PATENT DOCUMENTS

| | | | |
|---|---|---|---|
| 11,055,191 B2* | 7/2021 | Vittal | H04L 41/12 |
| 2005/0038533 A1* | 2/2005 | Farrell | G06F 16/9024 |
| | | | 707/E17.011 |
| 2007/0268294 A1* | 11/2007 | Eagen | H04L 41/22 |
| | | | 345/474 |
| 2015/0089366 A1* | 3/2015 | Beckett | G06F 3/0484 |
| | | | 715/716 |
| 2017/0353366 A1* | 12/2017 | Nasgowitz | H04L 41/12 |
| 2018/0075159 A1 | 3/2018 | Lin et al. | |
| 2018/0365336 A1 | 12/2018 | Raghavendra et al. | |
| 2021/0133245 A1* | 5/2021 | Reehil | H04L 41/342 |
| 2021/0160142 A1 | 5/2021 | Thai et al. | |

OTHER PUBLICATIONS

Liao, Qi, Aaron Striegel, and Nitesh Chawla. "Visualizing graph dynamics and similarity for enterprise network security and management." Proceedings of the seventh international symposium on visualization for cyber security. (Year: 2010).*
Hadlak, Steffen, Heidrun Schumann, and Hans-Jörg Schulz. "A Survey of Multi-faceted Graph Visualization." EuroVis (STARs). (Year: 2015).*
Chang, Xinjie. "Network simulations with OPNET." Proceedings of the 31st conference on Winter simulation: Simulation—a bridge to the future—vol. 1. (Year: 1999).*
Yu et al. English translation of CN_113904921_A_I. (Year: 2022).*
Bob Laliberte, et al., "Forward Networks: The Power of Visibility," Enterprise Strategy Group, ESG White Paper, Sep. 2021, 8 pages.
"The Value of NQE," Forward Networks, White Paper, retrieved Jul. 2022, 12 pages.
"Network Security," Forward Networks, https://www.forwardnetworks.com/, retrieved from the Internet Sep. 28, 2022, 21 pages.
Marco Falcier, et al., "h-omer/neo4j-versioner-core," Github, https://github.com/h-omer/neo4j-versioner-core, Jun. 24, 2021, 4 pages.
"The Time Bar," Cambridge Intelligence, https://cambridge-intelligence.com/time/, retrieved from the Internet Sep. 28, 2022, 9 pages.

* cited by examiner

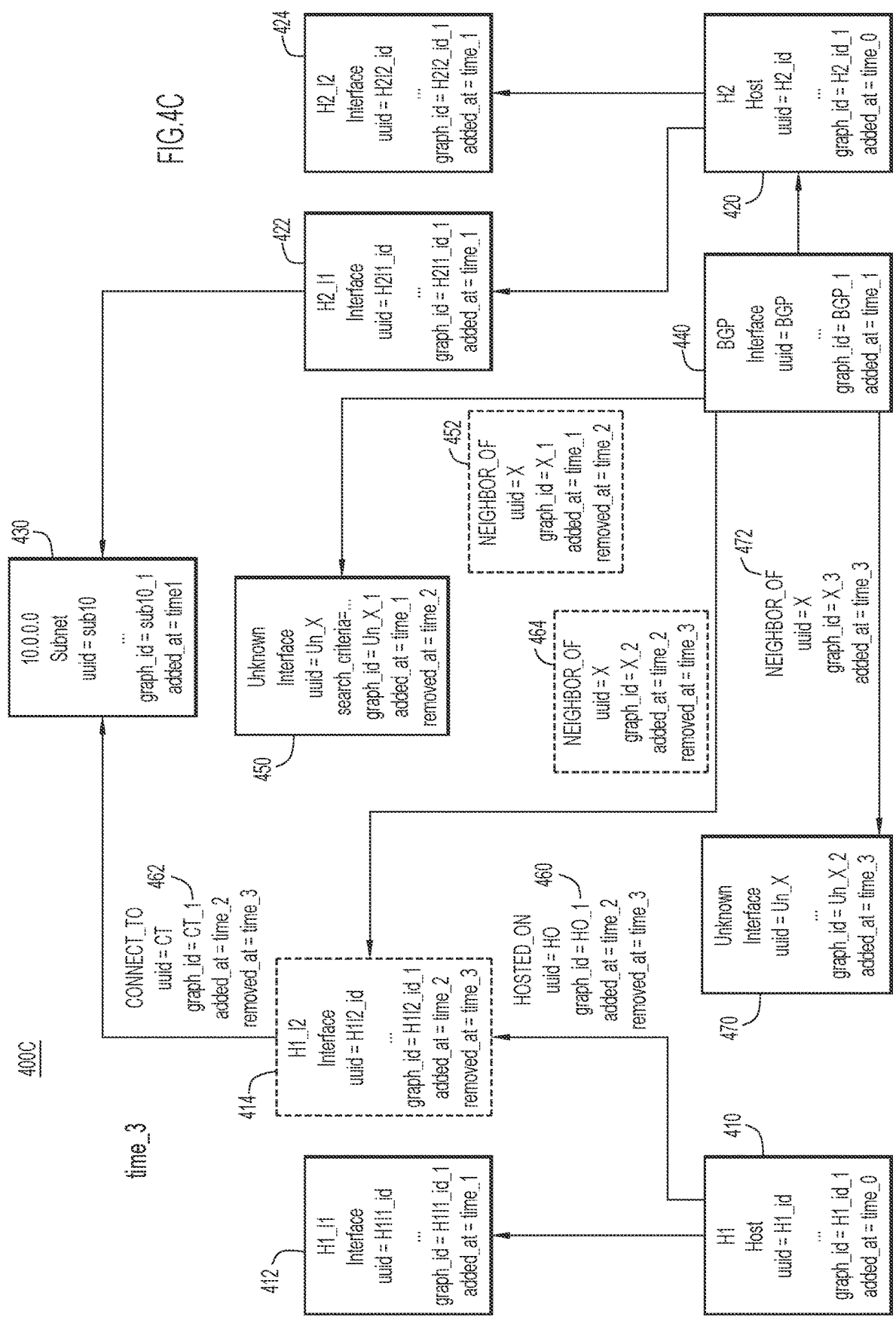

METHODS FOR IMPLEMENTING TIME-TRAVELLING NETWORKS USING EXTENSIONS TO GRAPH DATABASES

CROSS-REFERENCE TO RELATED APPLICATION

This application claims priority to U.S. Provisional Application No. 63/401,241, filed Aug. 26, 2022, the entirety of which is incorporated herein by reference.

TECHNICAL FIELD

The present disclosure relates to computer/data networking.

BACKGROUND

When performing a deep-dive investigation within a network to troubleshoot various issues, there is a need to address the temporal aspect of changes happening within independent logical domains of the network, such as for Layer 2 (L2) connectivity, protocols (Border Gateway Protocol (BGP), Internet Protocol Security (IPSEC), Link Layer Discovery Protocol (LLDP), Location Identifier (ID) Separation Protocol (LISP), Open Shortest Path First (OSPF), Address Resolution Protocol (ARP), etc.), and service tickets. It is useful to reflect the discrete nature of such changes while preserving cross-domain dependency to allow correlation and impact assessment during the investigation.

BRIEF DESCRIPTION OF THE DRAWINGS

FIGS. 4A-4C are diagrams depicting another example of how the network graph reflects changes over time using an Unknown/Undetermined node, according to an example embodiment.

DETAILED DESCRIPTION

Overview

In one form, a method is provided to enhance the visibility into the state of networking features in a network. The method may include obtaining from one or more networking devices operating in a network, configuration data related to configurations of each of the one or more networking devices and operational data related to logical states of networking features of each of the one or more networking devices. The method may involve generating graph data for a network graph based on the configuration data and operational data of the one or more networking devices, to maintain a logical view of the network. The network graph comprises a plurality of nodes and relationships that represent dependencies between nodes, and both nodes and relationships having property attributes. The method may further include recording a temporal history of each node and its state over time during operation of the network to track property changes of nodes, relationship changes between nodes and topological changes of the network.

Example Embodiments

Methods are presented herein for a reduced state machine that describes nodes and relationship dynamics representing real network elements (networking devices and software processes) in a computer/data network, and abstracted logical items. Logical states of networking features of the network elements are reflected in the graph, while configuration data is stored for completeness. A "Versioner Algorithm" is provided to record the temporal history of a node and its state over time within the node's metadata itself. A method is also provided to time-travel back to observe a historical view of the network. Further still, a method is provided to a determine difference of two historical topologies and return that data in human-readable or machine consumable form.

Figure 1:
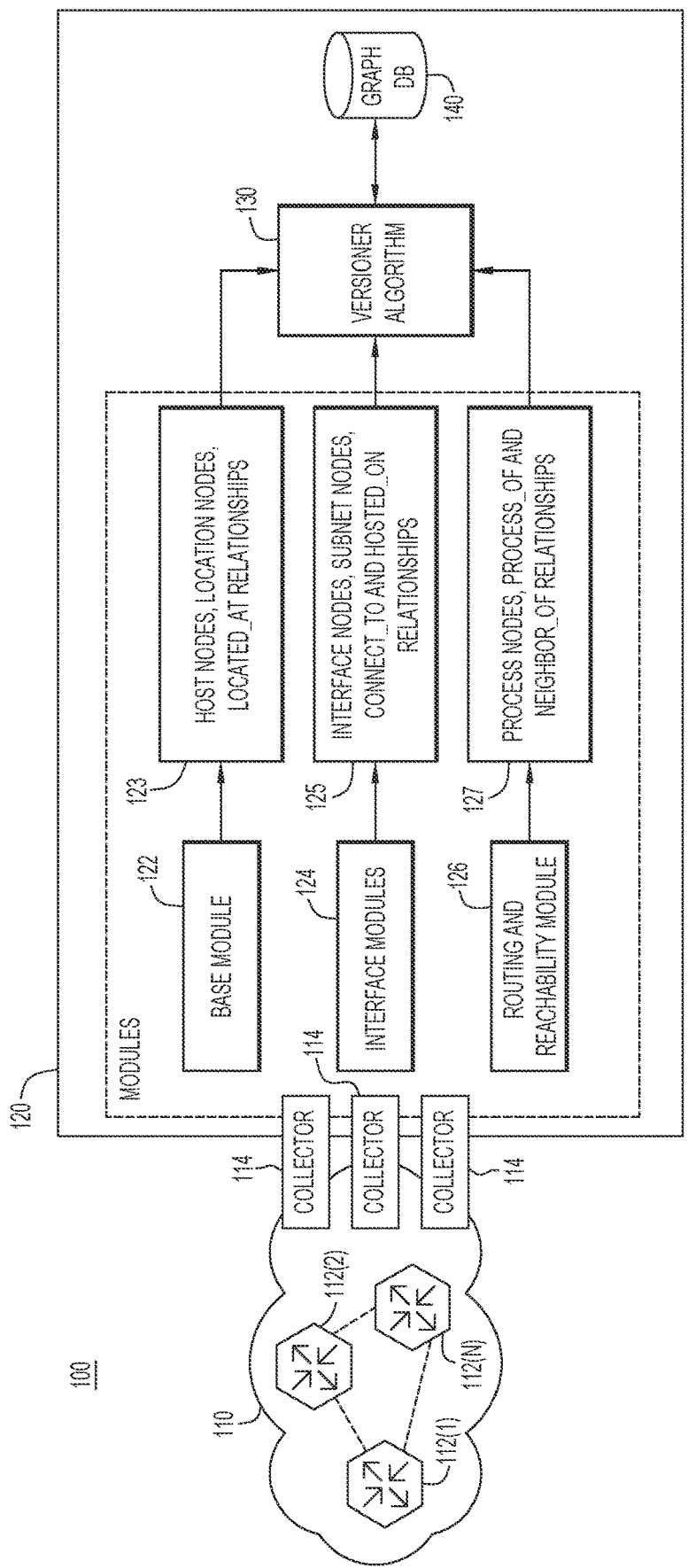
FIG. 1 is a diagram depicting a process flow for network graph creation, according to an example embodiment.

Reference is now made to FIG. 1, which depicts a system 100 by which a network graph model is created to represent states of a network 110. The network 110 includes a plurality of networking devices 112(1)-112(N) having various connections to each other through any of a variety of networking technology or protocols. As is known in the art, the networking devices 112(1)-112(N) may send, via telemetry techniques or in response to commands from a control or orchestrator entity, configuration data related to configurations of each of the one or more networking devices 112(1)-112(N) and operational data related to logical states of networking features of each of the one or more networking devices 112(1)-112(N) in network 110. FIG. 1 shows collectors 114 that may serve to collect the configuration data and operational data from the networking devices 112(1)-112(N). A network management station or network controller 120 may be in communication with the network 110 and receive the configuration data and operational data from the collectors 114. The network management station or network controller 120 may be co-located or remote from one or more sites where the networking devices 112(1)-112(N) reside. The networking devices 112(1)-112(N) may include wired and wireless networking devices, optical or electrical devices, such as routers, switches, gateways, access points, firewalls, load balancers, etc.

The network controller 120 executes various control and management software processes for the network 110. For example, the network controller 120 executes a plurality of (software) modules that process the configuration data and operational data collected from the networking devices 112(1)-112(N) in the network 110. The plurality of modules include a base module (also called host module) 122, interface modules 124 and a routing and reachability module 126. The network controller 120 also executes a "Versioner" algorithm 130 and data representing the network graph model is stored in a graph database (DB) 140.

The network controller 120 uses a property graph model to create and maintain a logical view on an end-to-end network perspective of the network 110. A graph is a collection of tuples: (source_node, relationship, destination_node). Every logical item is represented by a Node in the graph model (with a specified label), and Relationships (of a specified type) between nodes are used to keep track of any dependencies between. Both Nodes and Relationships have attributed properties.

The network controller 120 parses Information collected from the networking devices 112(1)-112(N) using technology specific modules 122, 124 and 126 to build the graph objects: Nodes and Relationships. The modules 122, 124 and 126 contribute such information to the Versioner Algorithm 130 that creates a common network graph data model that is stored by the graph DB 140.

Each of the modules 122, 124 and 126 contributes only a part of the network graph related to its specific collection context and parsing area. The modules 122, 124 and 126 can link Relationships to other existing graph items. The Versioner Algorithm 130 builds an overall network view using incremental updates that integrate information from different modules.

Example Network Graph

Figure 2:
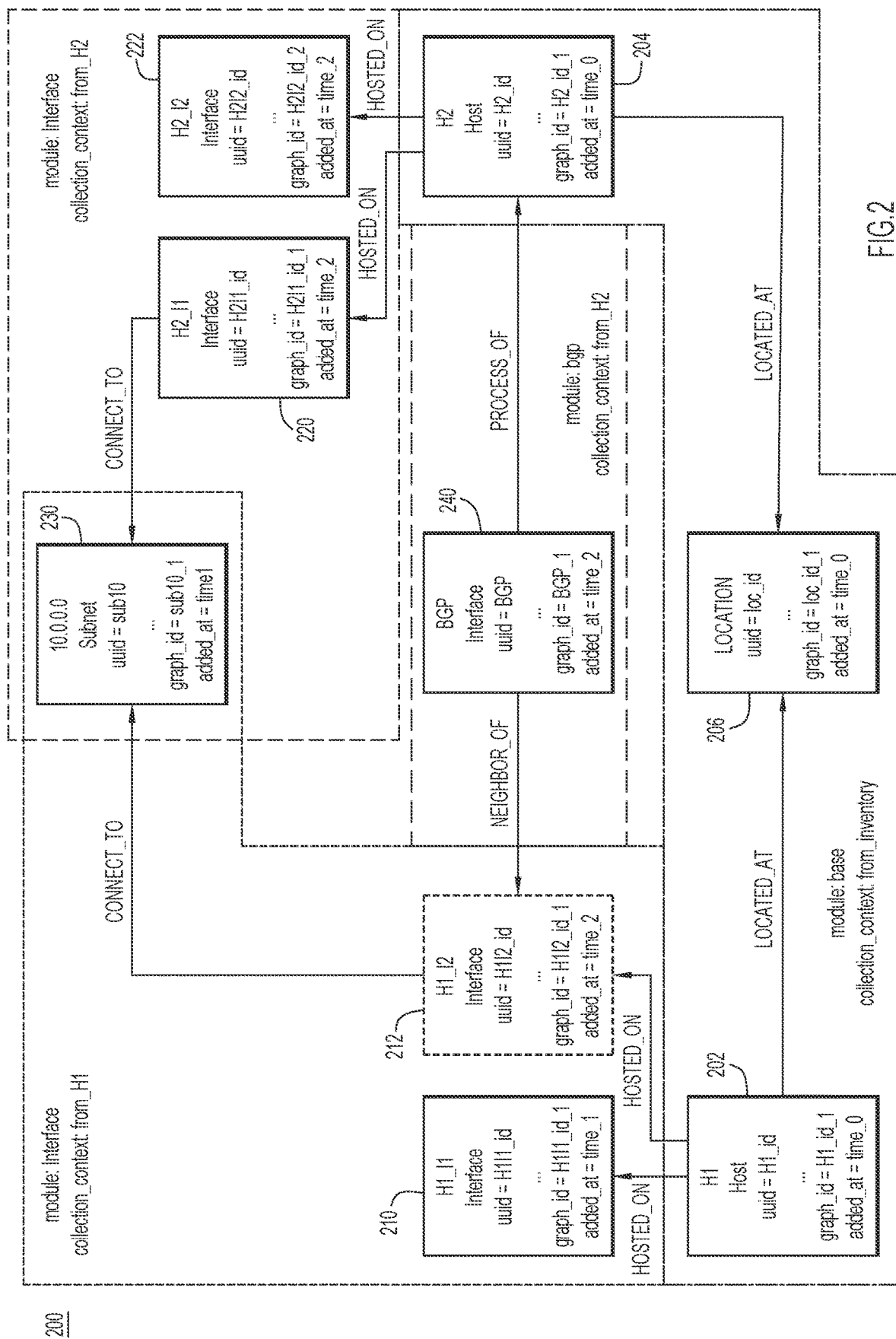
FIG. 2 is a diagram depicting an example of a network graph representation, according to an example embodiment.

Referring now to FIG. 2, an example network graph will be described, with continued reference to FIG. 1 FIG. 2 shows a network graph 200 for two interconnected hosts: H1 and H2. The hosts may be a router or a switch, for example. Host H1 has two interfaces, I1 and I2, and similarly host H2 has two interfaces, I1 and I2. The modules 122, 124 and 126 create the information of the network graph 200. The scope of the different modules is denoted in FIG. 2.

As shown at reference numeral 123 in FIG. 1, the base module 122 generates Host Nodes and Location Nodes interconnected with LOCATED_AT Relationship. In FIG. 2, there is a Host Node 202 for host H1 and a Host Node 204 for host H2. There is also a Location Node 206 having a LOCATED_AT Relationship with Host Node 202 and a LOCATED_AT Relationship with Host Node 204.

Two independent levels of identification are used for any Node or Relationship:
  object-level—as reported by the module—which is reflected within a universally unique identifier ('uuid') property.
  graph-level—as maintained by the Versioner Algorithm—which is reflected within a 'graph-id' property.

The object-level 'uuid' property is constructed by the module and is used to identify a network logic object in the graph. The graph-level 'graph-id' is used to distinguish between observed states of such an object.

Thus, for Host Node 202, the uuid is H1_id, and the graph_id is H1_id_1, and Host Node 202 is added to the graph (added_at) at time_0. Host Node 204 includes similar object-level and graph-level identifiers unique to Host Node 204, as indicated in graph 200. The Location Node 206 has a uuid=loc_id and graph_id=loc_id_1.

As shown at reference numeral 125 shown in FIG. 1, The interfaces modules 124 create Interface Nodes and Subnet Nodes linked with CONNECT_TO and HOSTED_ON Relationships. For example, in FIG. 2, the interface modules 124 create Interface Node 210 for interface I1 of host H1, Interface Node 212 for interface I2 of host H1, Interface Node 220 for interface I1 of host H2, and Interface Node 222 for interface I2 of host H2. The uuid and graph_id for each of the Interface Nodes 210, 212, 220 and 222 are shown in FIG. 2.

The interface modules 124 also create Subnet Node 230. The Subnet Node 230 has a uuid=sub10, and graph_id=sub10_1, for example. The Interface Node 210 and Interface Node 212 each has a HOSTED_ON Relationship with the Host Node 202. Similarly, the Interface Node 220 and Interface Node 222 each has a HOSTED_ON Relationship with the Host Node 204. In addition, Interface Node 212 has a CONNECT_TO Relationship with the Subnet Node 230.

As shown at reference numeral 127 in FIG. 1, the routing and reachability module 126 creates Process Nodes that have PROCESS_OF and NEIGHBOR_OF Relationships. For example, the routing and reachability module 126 may use the Border Gateway Protocol (BGP) process or technology. In FIG. 2, the routing and reachability module 126 creates a Process Node 240 that has a NEIGHBOR_OF Relationship with Interface Node 212 and PROCESS_OF Relationship with Host Node 204. Thus, in the example of FIG. 2, the network graph 200 indicates that interface I2 of host H1 is a BGP neighbor of host H2.

Saving Temporal Data within a Graph Database Node

Property-based graphs, based on nodes and relationships, are broadly used within many technological areas to reflect domain objects and inter-objects dependencies. The Versioner Algorithm 130 enhances such a graph to reflect temporal changes and keep track of each Node's property changes, each node's relationship changes and topological changes, such as by adding or removal of Nodes and/or Relationships.

Graph elements are never deleted from the graph, but a new version of the Node or Relationship is added, while existing items are only marked as removed. Object-level data reported by the applicable one of the modules 122, 124 and 126 are always compared with the graph stored information.

The graph is updated only when there is a detected change. Any change is noted with a discrete timestamp and is reflected in the graph using 'added_at' and 'removed_at' timestamps, which are property attributes for every Node or Relationship. That is, any such change is marked with the time of the change. This allows for tracking changes in the network over time and to go "back in time" to observe at how things changed over time to diagnose a problem.

There is no known technique of being able to visualize changes in the network, particularly a very large network. The data of the network graph is time series-based that can be added into a graph in a flexible way, with the ability to support multiple protocols. This allows for tracking the lifecycle of the network.

The Versioner Algorithm 130 uses a reduced state machine to reflect object-level dynamics within a graph:
  topology change: node added—new node graph object ('graph-id') is added with 'uuid' property as constructed by the module;
  topology change: node removed—existing node graph ('graph-id'), representing latest state of 'uuid' object is found and marked with removed property;
  topology change: relationship added—new relationship graph object ('graph-id') is added with 'uuid' property as constructed by the module;
  topology change: relationship removed—existing relationship ('graph-id'), representing latest state of 'uuid' object if found is marked with removed property;
  property change: node properties—change is reflected by marking previous graph node ('graph-id'+'uuid') with removed property and creating new graph node (new 'graph-id' but same 'uuid') with latest properties inside; and
  property change: relationship properties—change is reflected by marking previous graph relationship ('graph-id'+'uuid') with removed property and creating new graph relationship (new 'graph-id' but same 'uuid').

Method of Time-Travelling Through the History of the Network

Filtering based on 'removed_at' and 'added_at' timestamp properties, allows a network administrator user to select a desired moment in time for graph data. Information pieces are encoded within time-relevant Nodes while graph dependency is preserved using time-relevant Relationships.

Time-scale information can be created from 'added' and 'removed' properties observed within all Nodes and Relationships and ordering them in ascending or descending way.

For example:

'added_at' and 'removed_at' create a set of [time_0, time_2, time_1, time_3] values which can be ordered as: time_0<time_1<time_2<time_3

Minimum and maximum values designate network time travel boundaries. Time values present within those boundaries designate discrete time moments when network state can be reconstructed.

In order to view network state at 'desired_time' moment, an administrator user may select Nodes and Relationships with 'added_at' property BEFORE OR AT 'desired_time' AND not marked with 'removed_at' value BEFORE OR AT 'desired_time'. Returned Nodes and Relationships reflect the network graph at 'desired_time' moment. Within the property graph database implementation, such operation can be efficiently achieved using constructed CYPHER queries.

Figure 3A:
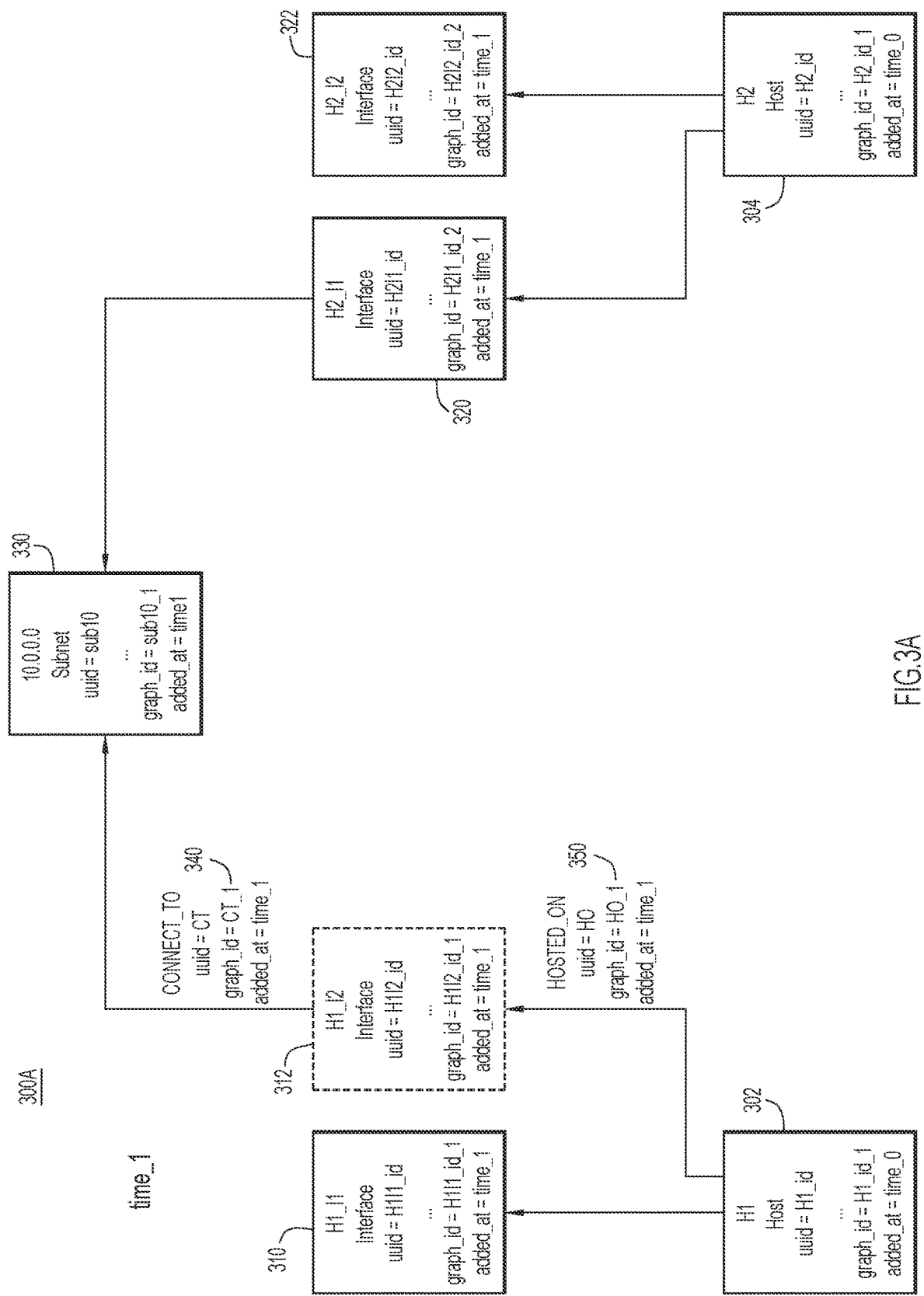
FIGS. 3A-3C are diagrams depicting an example of how the network graph reflects changes on an interface configuration, according to an example embodiment.
Figure 3B:
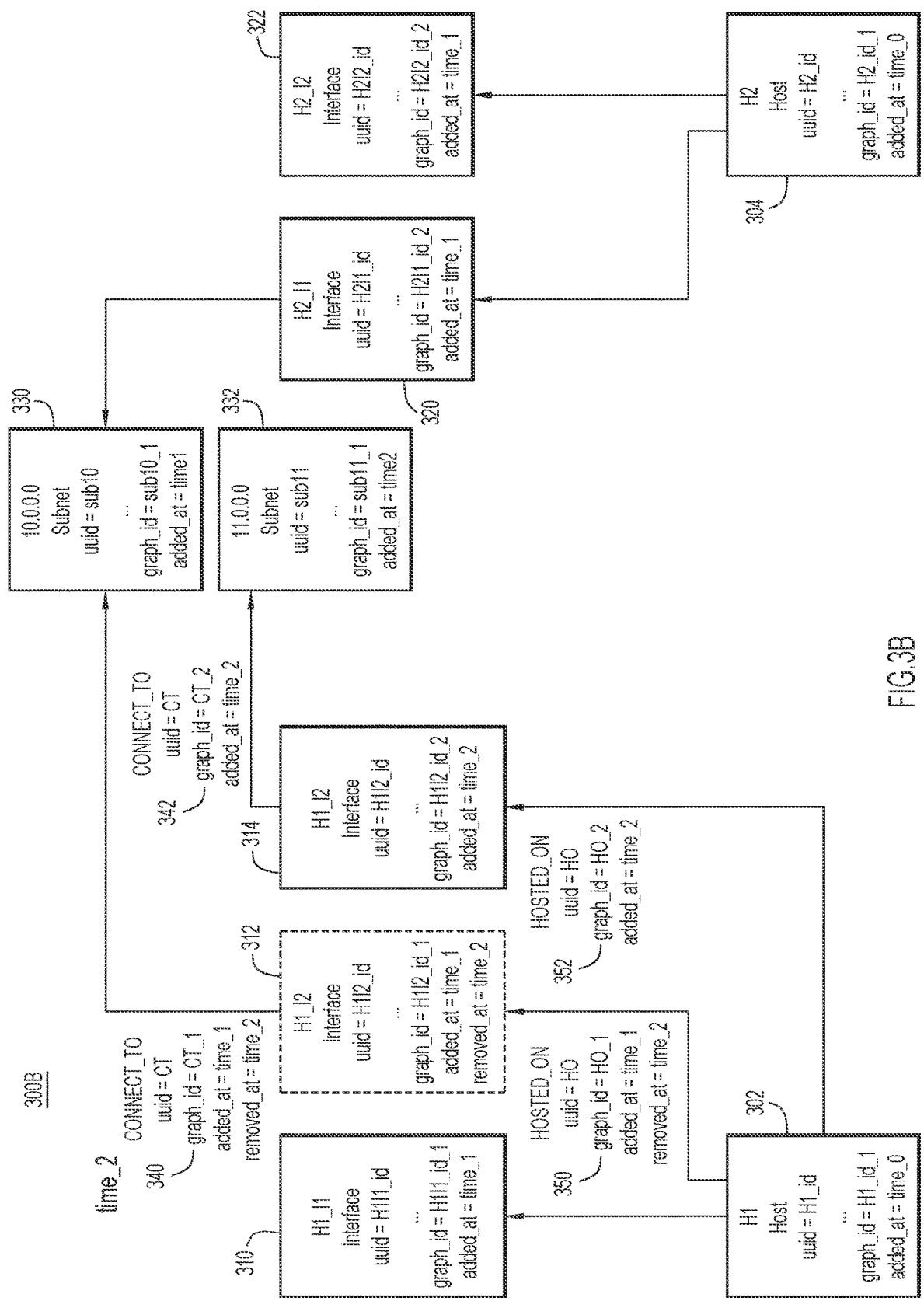
Figure 3C:
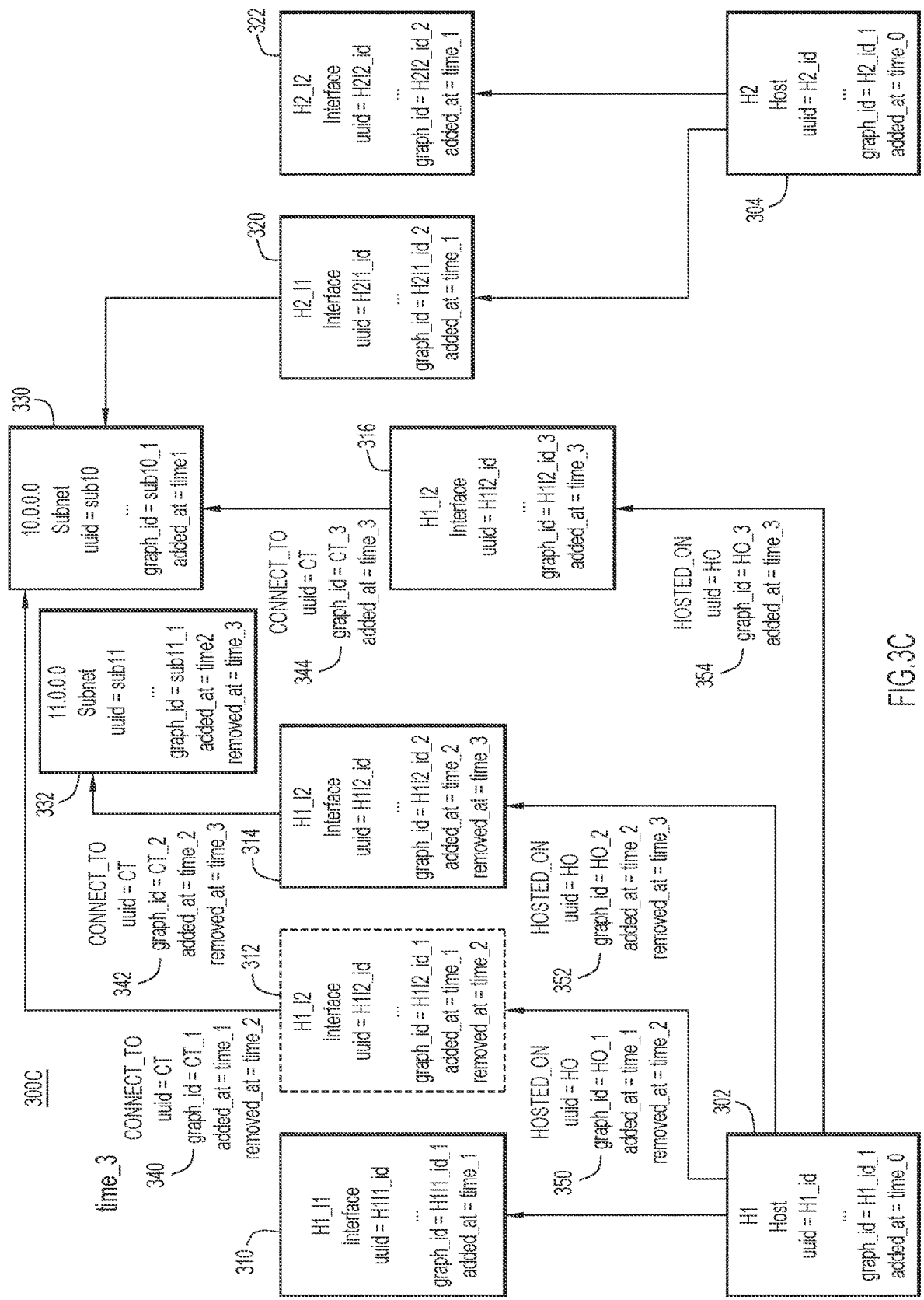

Reference is now made to FIGS. 3A-3C. The example depicted in FIGS. 3A-3C illustrates how a network graph reflects a change on an interface configuration of interface I2 on Host H1 (H1_I2) to connect initially to subnetwork 10.0.0.0, then to subnetwork 11.0.0.0 and finally back to subnetwork 10.0.0.0. Purposely, this is divided into three different time moments or instants: time_1 shown in FIG. 3A, time_2 shown in FIG. 3B and time_3 shown in FIG. 3C. It is worthy to note the values of 'uuid' and 'graph_id' in these figures. Some information is now shown in FIGS. 3A-3C, such a Relationships, to the extent such information is not relevant to the concepts to be presented by these figures.

FIG. 3A shows a network graph 300A for a network with two hosts, H1 and H2, at time_1. The network graph 300A includes Host Nodes 302 and 304 for hosts H1 and H2, respectively. There are Interface Nodes 310 and 312 for interfaces I1 and I2 of host H1, respectively, and Interface Nodes 320 and 322 for interfaces I1 and I2 of host H2, respectively. In addition, there is a Subnet Node 330 for subnet 10.0.0.0. Thus, at time_1, Interface Node 312 (H1_I2) is created with uuid property equal to H1I2_id and graph_id property equal H1I2_id_1. The Relationship HOSTED_ON with uuid=HO shown at 350 is created to reflect information that Interface Node 312 is configured on host H1. The fact that interface H1_I2 has an IP address configured from subnet 10.0.0.0 is reflected through the Relationship CONNECTS_TO shown at 340, between the Interface Node 312 and Subnet Node 330.

Turning now to FIG. 3B, at time_2 a network configuration change is reflected on the network graph 300B. New Node instances and new Relationships instances are created—with new graph_id values but the original uuids are maintained. Previous instances of nodes and relationships are marked with removed_at=time_2 property to indicate they are no longer valid. A new Interface Node 314 (H1_I2) is created with the same uuid=H1I2_id as Interface Node 312, but with a different graph_id=H1I2_id_2 (whereas Interface Node 312 has a graph_id=H1I2_id_1). A new Subnet Node 332 (for subnet 11.0.0.0) is added. New Interface Node 314 has a CONNECTED_TO Relationship, shown at 342, to new Subnet Node 332. In addition, new Interface Node 314 has a HOSTED_ON Relationship, shown a 352, to Host Node 302.

Reference is now made to FIG. 3C which shows network graph 300C at a further instance of time. At time_3 yet another change in interface configuration is reflected for Interface I2 of host H1, as shown by new Interface Node 316. Interface Node 316 is a third instance of Node H1_I2 created with the same uuid value as Interface Node 312 (and Interface Node 314) but a new graph_id (graph_id=H1I2_id_3). New Relationships are created to reflect the fact that H1_I2 Interface Node 316 is HOSTED_ON host H1, as shown by Relationship Node 354, and its IP address CONNECTS_TO subnet 10.0.0.0, as shown by Relationship Node 344. Previous instances of Nodes and Relationships which are no longer valid are marked with removed_at=time_3 property, as shown in FIG. 3C.

Method to Perform a Difference of Two Historical Topologies

Two historical network views can be compared for any differences. Time-travel functionality may involve extracting a graph network view at two different moments in time. Using the object-level uuid values referred to above, it is possible to find comparable graph items in the network graph and to then extract differences between those comparable items despite a changing graph topology. Any topology related changes or property related changes can be easily identified.

Modules can also refer to yet unknown graph items using an 'Undetermined' Relationship, which serves as a placeholder for a Relationship that can be resolved later, after necessary information is collected and presented within the network graph. In this way, the graph always reflects a current logical view of the network. Nodes with 'Undetermined' or 'Unknown' information can be used to identify and investigate a broken or incomplete view of information of an aspect of a network to be investigated.

Figure 4A:
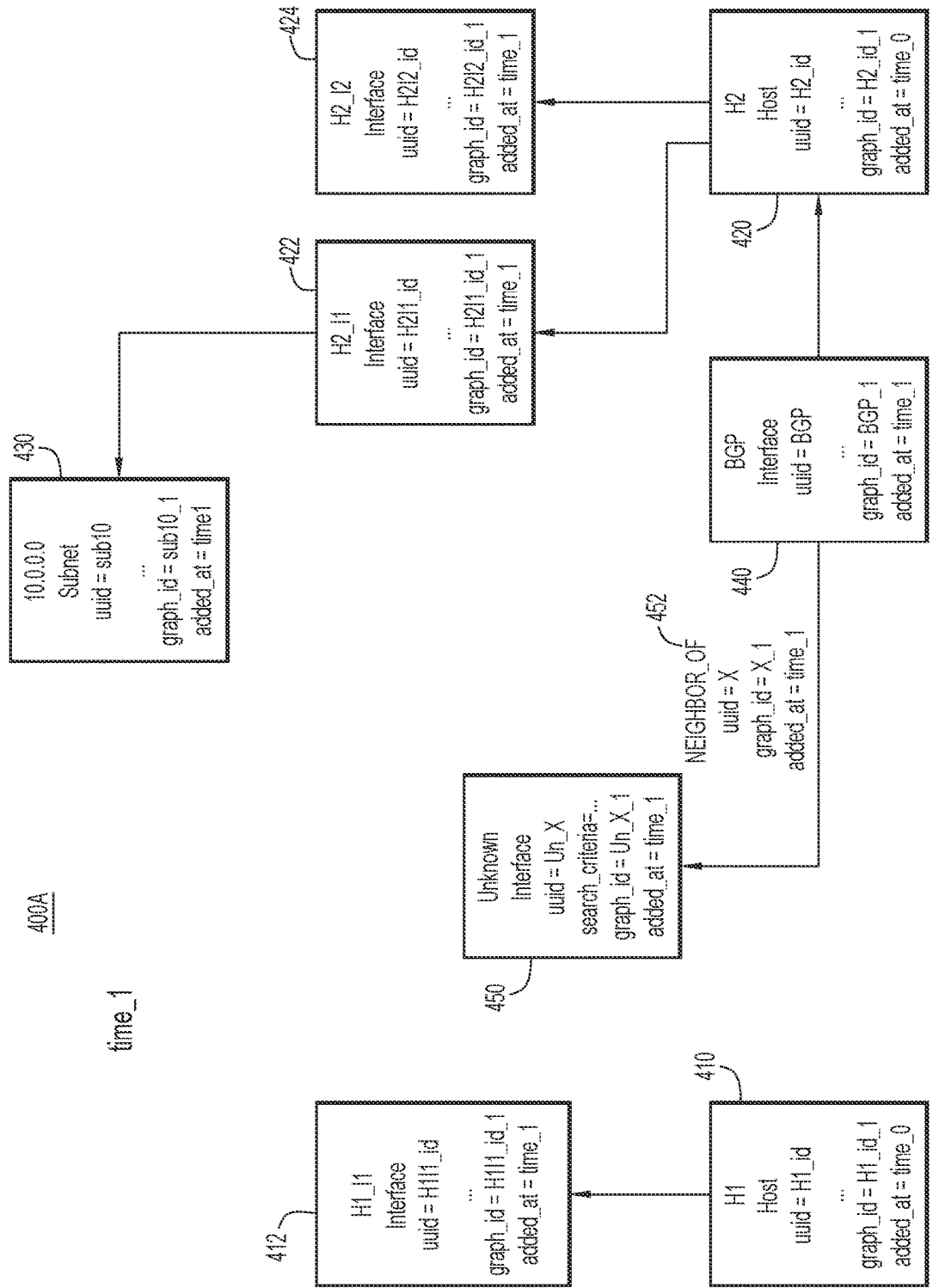
Figure 4B:
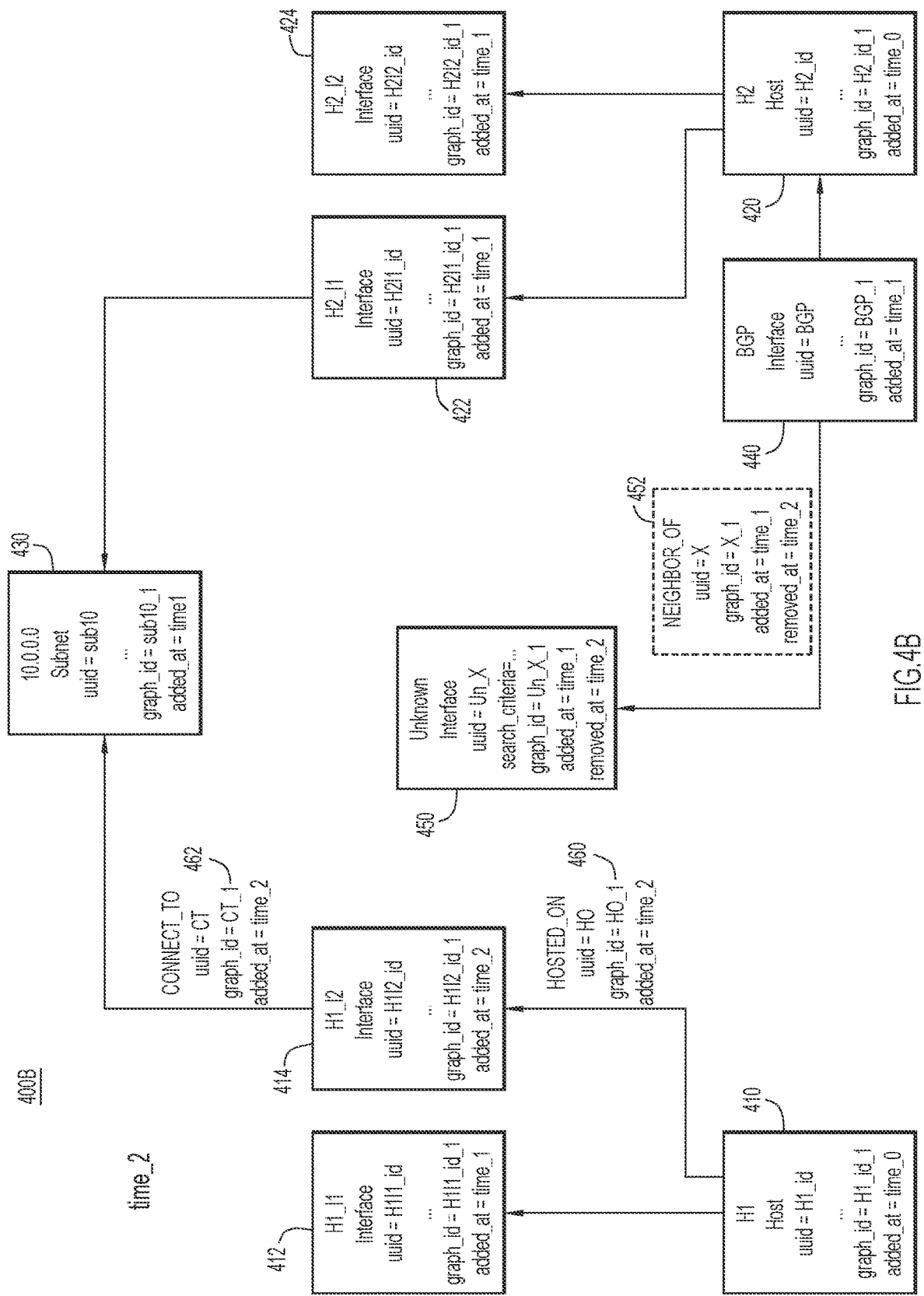

Reference is now made to FIGS. 4A-4C for describing an example where a Node has an Undetermined or Unknown status, and how that may change over time. FIG. 4A shows another example of a network graph 400A at time_1. In network graph 400A, there is a Host Node 410 for a Host H1 that has an associated Interface Node 412 for interface I1 of Host H1. There also is a Host Node 420 for Host H2 that has associated Interface Nodes 422 and 424 for interfaces I1 and I2 of Host H2. There is a Subnet Node 430 connected to Interface Node 422 to indicate that interface I1 of host H2 is connected to subnet 10.0.0.0. There is an BGP Interface Node 440 connected to Host Node 420. Also, noteworthy in FIG. 4A is an Unknown/Undetermined Interface Node 450. At time_1, there is not enough information to resolve the type of interface that Interface Node 450 represents, but it is known that it is a NEIGHBOR_OF BGP Interface Node 430 as shown by Relationship 452 in FIG. 4A.

Turning now to FIG. 4B, a network graph 400B is shown at time_2. Some time later, it has now been determined the Unknown/Undetermined Interface Node 450 is actually an interface (Interface I2) of Host H1 and so Interface Node 414 is added to indicate that Interface I2 of Host H1 is HOSTED_ON Host H1 as shown at reference numeral 460, is a NEIGHBOR_OF BGP Interface Node 430 as shown at reference numeral 462 and is CONNECTED_TO Subnet Node 430 (indicating the Interface H2 of Host H1 is connected to subnet 10.0.0.0) as shown at reference numeral 464. The status of Unknown/Undetermined Interface Node 450 is updated in network graph 400B to indicate that it has been removed at time_2, as shown in FIG. 4B.

FIG. 4C shows network graph 400C at time_3. The difference at this time is that Interface Node 414 has been removed, as well as its associated Relationships 460, 462 and 464, and a new Unknown/Undetermined Interface Node 470 has been added that has a NEIGHBOR_OF Relationship 472 with BGP Interface Node 440. Thus, an Unknown/Undetermined Node can be used to temporarily provide a placeholder in a network graph until more information becomes available to update the network graph with a new Node, at which time the Unknown/Undetermined Node and its associated Relationships are removed.

Time travel can work on a slice of original data and analyze it towards temporal dynamic key performance indicators to determine how often an interface is changing its network or at which moments are Open Shortest Path First (OSPF) protocol timers mismatch spotted, for example. Furthermore, temporal correlation between configuration and feature state is an enabler to create assurance rules. As the configuration changes over time, that can be correlated to feature state change over time and model correlations to identify anomalies. For example, counting the number of Unknown Interface Nodes connected using the NEIGHBOUR_OF Relationship from a selected BGP node can indicate whether BGP reached a convergence state (i.e., when the number decreased and remained similar for a selected time period). The unexpected sudden growth of the count of Unknown Interface Nodes may be an indicator of network failure and routing instability due to lost BGP peering.

In summary, the logical states of networking features of a network are reflected in a graph, and configuration data is stored for completeness. An algorithm referred to as a Versioner Algorithm" records the temporal history of a Node and its state over time within the Node's metadata itself, while recorded Relationships represent logical relations between observed Nodes. This allows to "time-travel" back in time to see a historical view of the network or provide a difference between two historical topology snapshots.

Filtering may be performed based on 'removed_at' and 'added_at' timestamp properties, allowing for selection of a desired moment in time for graph data. Information pieces are encoded within time-relevant Nodes while graph dependency is preserved using time-relevant Relationships. Timescale information can be created from added and removed properties observed within all Nodes and Relationships and ordering them in an ascending or descending way. These techniques also involve comparing two historical network views for any differences. Time-travel functionality can extract graph network views at two different moments in time. The techniques may involve the use of two levels of identification (object level and graph level), where 'object-id' values are used to find comparable items and to extract differences despite a changing graph topology.

Figure 5:
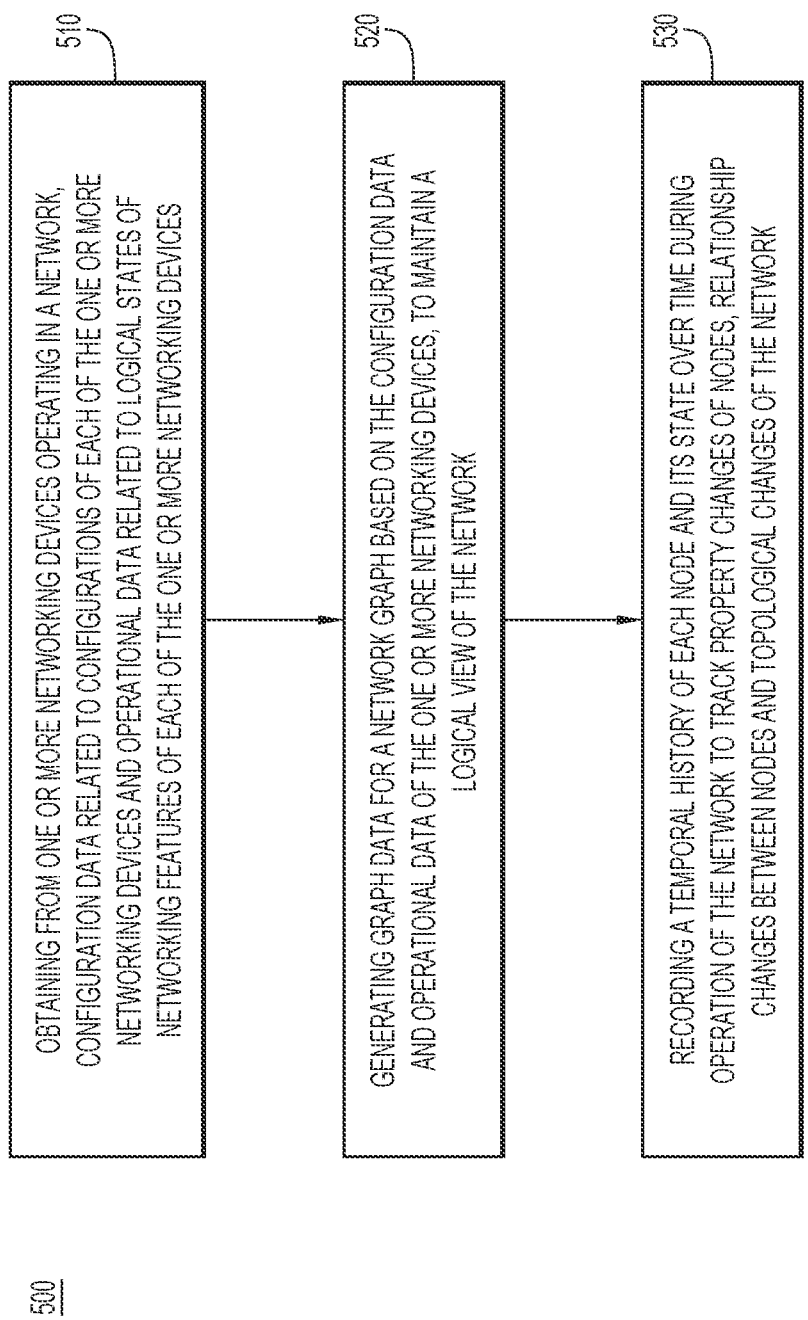
FIG. 5 is a flow chart depicting operations of a method according to an example embodiment.

Reference is now made to FIG. 5 for a description of a computer-implemented method 500 according to an example embodiment. At step 510, the method 500 involves obtaining from one or more networking devices operating in a network, configuration data related to configurations of each of the one or more networking devices and operational data related to logical states of networking features of each of the one or more networking devices. At step 520, the method 500 involves generating graph data for a network graph based on the configuration data and operational data of the one or more networking devices, to maintain a logical view of the network. The network graph comprises a plurality of nodes and relationships that represent dependencies between nodes, and both nodes and relationships having attributed properties. At step 530, the method 500 involves recording a temporal history of each node and its state over time during operation of the network to track property changes of nodes, relationship changes between nodes and topological changes of the network.

Figure 6:
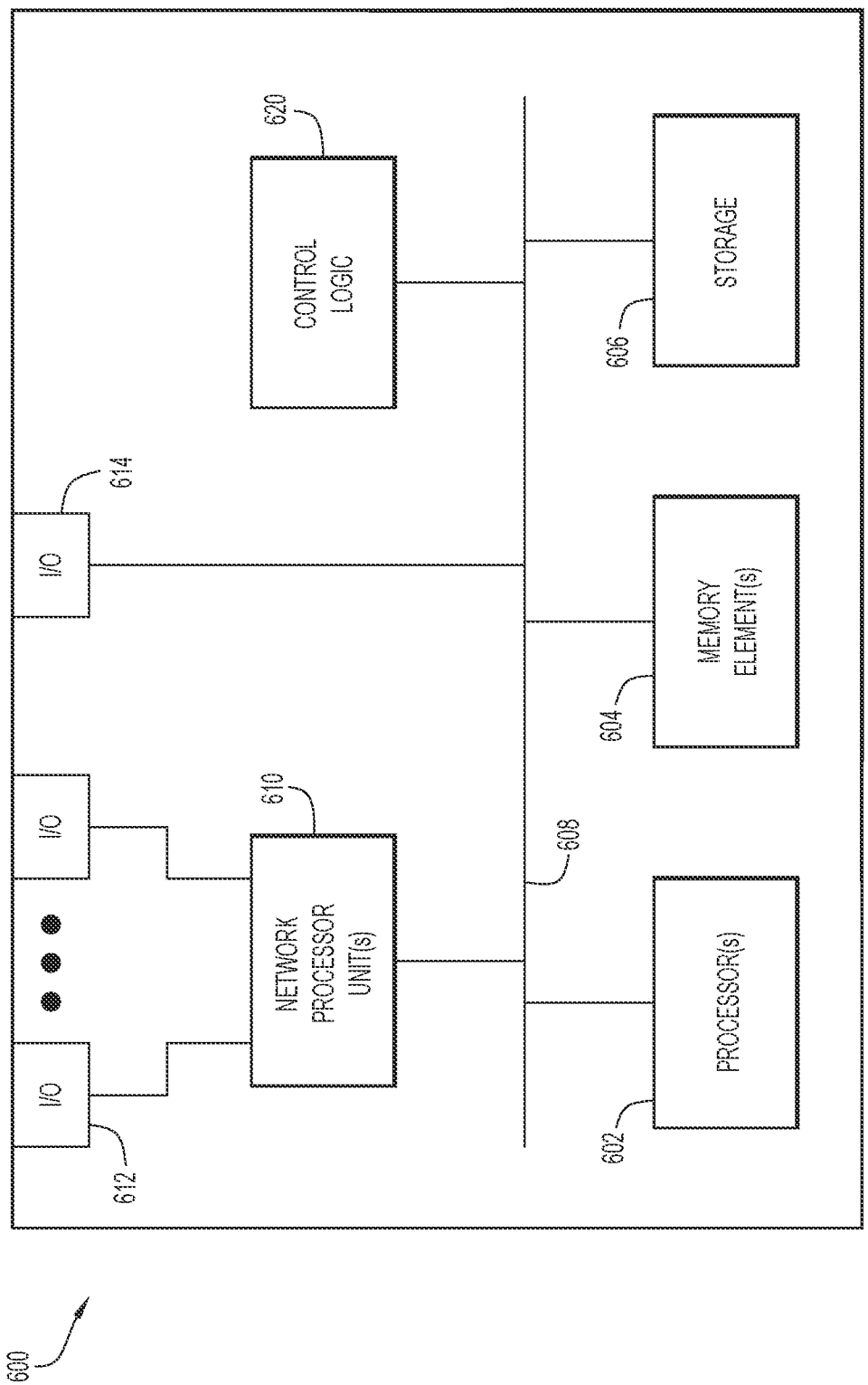
FIG. 6 is a hardware block diagram of a computing device may be configured to perform the network graph representation techniques, according to an example embodiment.

Referring to FIG. 6, FIG. 6 illustrates a hardware block diagram of a computing device 600 that may perform functions associated with operations discussed herein in connection with the techniques depicted in FIGS. 1, 2, 3A-3C, 4A-4C and 5. In various embodiments, a computing device or apparatus, such as computing device 600 or any combination of computing devices 600, may be configured as any entity/entities, such as network controller 120 shown in FIG. 1, as discussed for the techniques depicted in connection with FIGS. 1, 2, 3A-3C, 4A-4C and 5 in order to perform operations of the various techniques discussed herein.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor (processor device such as a microprocessor, microcontroller, etc.) configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s)602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s)604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio- Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

In some aspects, the techniques described herein relate to a computer-implemented method including: obtaining from one or more networking devices operating in a network, configuration data related to configurations of each of the one or more networking devices and operational data related to logical states of networking features of each of the one or more networking devices; generating graph data for a network graph based on the configuration data and operational data of the one or more networking devices, to maintain a logical view of the network, wherein the network graph includes a plurality of nodes and relationships that represent dependencies between nodes, and both nodes and relationships having property attributes; and recording a temporal history of each node and its state over time during operation of the network to track property changes of nodes, relationship changes between nodes and topological changes of the network.

In some aspects, the techniques described herein relate to a computer-implemented method, wherein generating graph data for the network graph includes using a plurality of technology specific modules/processes each of which contributes part of the network graph related to a specific collection context.

In some aspects, the techniques described herein relate to a computer-implemented method, wherein each node includes data that describes a networking logic object using two independent levels of identification including an object-level identifier that identifies a networking logic object and a graph-level identifier that distinguishes between observed states of the networking logic object.

In some aspects, the techniques described herein relate to a computer-implemented method, wherein generating graph data for the network graph includes generating: a host node and a location node for each host networking device in the network, the host node that identifies the host networking device, and the location node representing connectivity between the two host nodes with a located-at relationship; an interface node representing an interface of a host node and that has a hosted-on relationship to a host node; a subnet node representing a subnet and that has a connected-to relationship to one or more host nodes; and a process node that represents routing and reachability between host networking devices and that has a process-of relationship with a host node and a neighbor-of relationship with an interface node.

In some aspects, the techniques described herein relate to a computer-implemented method, wherein recording includes adding a new version of a node or of a relationship and marking existing nodes as removed but not deleted from the network graph.

In some aspects, the techniques described herein relate to a computer-implemented method, further including: based on the obtaining, detecting a change in the network; and in response to detecting a change in the network, recording includes updating a node and/or relationship with a timestamp of the change and an indicator of whether a node has been added or marked to be removed at a corresponding timestamp.

In some aspects, the techniques described herein relate to a computer-implemented method, further including: displaying a visual representation of the network graph, including changes in states of respective nodes to enable travel in time to provide a historical view of the network.

In some aspects, the techniques described herein relate to a computer-implemented method, further including: comparing two historical network views of the network at two different moments of time to determine one or more differences between the two historical network views.

In some aspects, the techniques described herein relate to an apparatus including: a network interface that enables communication with one or more networking devices operating in a network; a memory that stores data and instructions; and one or more processor devices coupled to the memory and the network interface, the one or more processor devices executing the instructions stored in the memory to perform operations including: obtaining from the one or more networking devices in the network, configuration data related to configurations of each of the one or more networking devices and operational data related to logical states of networking features of each of the one or more networking devices; generating graph data for a network graph based on the configuration data and operational data of the one or more networking devices, to maintain a logical view of the network, wherein the network graph includes a plurality of nodes and relationships that represent dependencies between nodes, and both nodes and relationships having property attributes; and recording a temporal history of each node and its state over time during operation of the network to track property changes of nodes, relationship changes between nodes and topological changes of the network.

In some aspects, the techniques described herein relate to one or more non-transitory computer readable storage media encoded with instructions that, when executed by a processor, cause the processor to perform operations including: obtaining from one or more networking devices operating in a network, configuration data related to configurations of each of the one or more networking devices and operational data related to logical states of networking features of each of the one or more networking devices; generating graph data for a network graph based on the configuration data and operational data of the one or more networking devices, to maintain a logical view of the network, wherein the network graph includes a plurality of nodes and relationships that represent dependencies between nodes, and both nodes and relationships having property attributes; and recording a temporal history of each node and its state over time during operation of the network to track property changes of nodes, relationship changes between nodes and topological changes of the network.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
obtaining from one or more networking devices operating in a network, configuration data related to configurations of each of the one or more networking devices and operational data related to logical states of networking features of each of the one or more networking devices;
generating graph data for a network graph based on the configuration data and operational data of the one or more networking devices, to maintain a logical view of the network, wherein the network graph comprises a plurality of nodes and relationships that represent dependencies between nodes, and both nodes and relationships having property attributes, and wherein each node and relationship comprises data that describes a networking logic object using two independent levels of identification including an object-level identifier that identifies a networking logic object and a graph-level identifier that distinguishes between observed states of the networking logic object, wherein generating graph data for the network graph includes generating:
a host node for each host networking device in the network, the host node identifying the host networking device;
an interface node representing an interface of a host node and that has a hosted-on relationship to a host node;

a subnet node representing a subnet and that has a connected-to relationship to one or more host nodes; and a process node that represents routing between host networking devices and that has a process-of relationship with a host node and a neighbor-of relationship with an interface node; and recording a temporal history of each node and its state over time during operation of the network to track property changes of nodes, relationship changes between nodes and topological changes of the network, wherein the property changes of the nodes, the relationship changes between nodes, and the topological changes of the network are determined by analyzing the object-level identifier of each node in combination with graph-level identifier of each node, wherein recording the property changes of the nodes includes marking at least one node as removed but not deleted at a time point during the temporal history, and wherein the at least one node is marked as added at a subsequent time point to the time point during the temporal history.

2. The computer-implemented method of claim 1, wherein generating graph data for the network graph includes using a plurality of technology specific modules/processes each of which contributes part of the network graph related to a specific collection context.

3. The computer-implemented method of claim 1, wherein generating graph data for the network graph further includes providing:

a location node for each host networking device in the network, wherein the location node represents connectivity between two host nodes with a located-at relationship.

4. The computer-implemented method of claim 1, wherein recording comprises adding a new version of a node or of a relationship and marking existing nodes as removed but not deleted from the network graph.

5. The computer-implemented method of claim 4, further comprising:

based on the obtaining, detecting a change in the network; and in response to detecting a change in the network, recording comprises updating a node and/or relationship with a timestamp of the change and an indicator of whether a node has been added or marked to be removed at a corresponding timestamp.

6. The computer-implemented method of claim 5, further comprising:

displaying a visual representation of the network graph, including changes in states of respective nodes to enable travel in time to provide a historical view of the network.

7. The computer-implemented method of claim 5, further comprising:

comparing two historical network views of the network at two different moments of time to determine one or more differences between the two historical network views.

8. The computer-implemented method of claim 1, wherein a new graph-level identifier is assigned to a particular node or particular relationship when the particular node or particular relationship is added, and when the particular node or particular relationship is removed.

9. The computer-implemented method of claim 1, further comprising:

filtering the temporal history of each node and the state of each node using a node-added filter or a node-removed filter, wherein the node-added filter indicates points in the temporal history at which one or more nodes are added, and the node-removed filter indicates points in the temporal history at which one or more nodes are removed.

10. An apparatus comprising:

a network interface that enables communication with one or more networking devices operating in a network;

a memory that stores data and instructions; and one or more processor devices coupled to the memory and the network interface, the one or more processor devices executing the instructions stored in the memory to perform operations including:

obtaining from the one or more networking devices in the network, configuration data related to configurations of each of the one or more networking devices and operational data related to logical states of networking features of each of the one or more networking devices;

generating graph data for a network graph based on the configuration data and operational data of the one or more networking devices, to maintain a logical view of the network, wherein the network graph comprises a plurality of nodes and relationships that represent dependencies between nodes, and both nodes and relationships having property attributes, and wherein each node and relationship comprises data that describes a networking logic object using two independent levels of identification including an object-level identifier that identifies a networking logic object and a graph-level identifier that distinguishes between observed states of the networking logic object, wherein generating the graph data for the network graph includes generating:

a host node and a location node for each host networking device in the network, the host node identifying the host networking device, and the location node representing connectivity between two host nodes with a located-at relationship;

an interface node representing an interface of a host node and that has a hosted-on relationship to a host node;

a subnet node representing a subnet and that has a connected-to relationship to one or more host nodes; and a process node that represents routing and reachability between host networking devices and that has a process-of relationship with a host node and a neighbor-of relationship with an interface node; and recording a temporal history of each node and its state over time during operation of the network to track property changes of nodes, relationship changes between nodes and topological changes of the network, wherein the property changes of the nodes, the relationship changes between nodes, and the topological changes of the network are determined by analyzing the object-level identifier of each node in combination with graph-level identifier of each node.

11. The apparatus of claim 10, wherein generating graph data for the network graph includes using a plurality of technology specific modules/processes each of which contributes part of the network graph related to a specific collection context.

12. The apparatus of claim 10, wherein recording comprises adding a new version of a node or of a relationship and marking existing nodes as removed but not deleted from the network graph.

13. The apparatus of claim 12, wherein the one or more processor devices execute the instructions to further perform:
  based on the obtaining, detecting a change in the network; and
  in response to detecting a change in the network, recording comprises updating a node and/or relationship with a timestamp of the change and an indicator of whether a node has been added or marked to be removed at a corresponding timestamp.

14. The apparatus of claim 13, wherein the one or more processor devices execute the instructions to further perform:
  generating for display a visual representation of the network graph, including changes in states of respective nodes to enable travel in time to provide a historical view of the network.

15. The apparatus of claim 13, wherein the one or more processor devices execute the instructions to further perform:
  comparing two historical network views of the network at two different moments of time to determine one or more differences between the two historical network views.

16. The apparatus of claim 10, wherein a new graph-level identifier is assigned to a particular node or particular relationship when the particular node or particular relationship is added, and when the particular node or particular relationship is removed.

17. One or more non-transitory computer readable storage media encoded with instructions that, when executed by a processor, cause the processor to perform operations including:
  obtaining from one or more networking devices operating in a network, configuration data related to configurations of each of the one or more networking devices and operational data related to logical states of networking features of each of the one or more networking devices;
  generating graph data for a network graph based on the configuration data and operational data of the one or more networking devices, to maintain a logical view of the network, wherein the network graph comprises a plurality of nodes and relationships that represent dependencies between nodes, and both nodes and relationships having property attributes, and wherein each node and relationship comprises data that describes a networking logic object using two independent levels of identification including an object-level identifier that identifies a networking logic object and a graph-level identifier that distinguishes between observed states of the networking logic object, wherein generating graph data for the network graph includes generating:
    a host node for each host networking device in the network, the host node identifying the host networking device;
    an interface node representing an interface of a host node and that has a hosted-on relationship to a host node;
    a subnet node representing a subnet and that has a connected-to relationship to one or more host nodes; and
    a process node that represents routing between host networking devices and that has a process-of relationship with a host node and a neighbor-of relationship with an interface node; and
  recording a temporal history of each node and its state over time during operation of the network to track property changes of nodes, relationship changes between nodes and topological changes of the network, wherein the property changes of the nodes, the relationship changes between nodes, and the topological changes of the network are determined by analyzing the object-level identifier of each node in combination with graph-level identifier of each node, wherein recording the property changes of the nodes includes marking at least one node as removed but not deleted at a time point during the temporal history, and wherein the at least one node is marked as added at a subsequent time point to the time point during the temporal history.

18. The one or more non-transitory computer readable storage media of claim 17, wherein generating graph data for the network graph includes using a plurality of technology specific modules/processes each of which contributes part of the network graph related to a specific collection context.

19. The one or more non-transitory computer readable storage media of claim 17, wherein generating graph data for the network graph further includes providing:
  a location node for each host networking device in the network, wherein the location node represents connectivity between two host nodes with a located-at relationship.

20. The one or more non-transitory computer readable storage media of claim 17, wherein a new graph-level identifier is assigned to a particular node or particular relationship when the particular node or particular relationship is added, and when the particular node or particular relationship is removed.

* * * * *